US009323598B2

(12) United States Patent
Surazski et al.

(10) Patent No.: US 9,323,598 B2
(45) Date of Patent: *Apr. 26, 2016

(54) BUG CLEARING HOUSE

(71) Applicant: Google Inc., Mountain View, CA (US)

(72) Inventors: Jacek Surazski, Cracow (PL); Jason B. Parks, Austin, TX (US); Dawid Duda, Zielonki (PL)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/549,131

(22) Filed: Nov. 20, 2014

(65) Prior Publication Data

US 2015/0234699 A1  Aug. 20, 2015

Related U.S. Application Data

(63) Continuation of application No. 13/111,791, filed on May 19, 2011, now Pat. No. 8,898,637.

(60) Provisional application No. 61/346,453, filed on May 19, 2010.

(51) Int. Cl.
 *G06F 9/44* (2006.01)
 *G06F 11/07* (2006.01)
 *G06Q 10/10* (2012.01)

(52) U.S. Cl.
 CPC .............. *G06F 11/0775* (2013.01); *G06F 8/71* (2013.01); *G06F 11/0748* (2013.01); *G06Q 10/10* (2013.01)

(58) Field of Classification Search
 CPC ... G06F 11/3688; G06F 11/3664; G06F 8/20; G06F 8/71; G06F 11/0775; G06Q 10/06
 See application file for complete search history.

(56) References Cited

U.S. PATENT DOCUMENTS 6,725,399 B1 * 4/2004 Bowman ............. G06F 11/3664
                                                      714/38.14
6,978,441 B2   12/2005 Atwood et al.
(Continued)

FOREIGN PATENT DOCUMENTS

JP    2002-149855    5/2002
JP    2011-525275    9/2011
WO    2009/148781   12/2009

OTHER PUBLICATIONS

Ko et al., Design, discussion, and dissent in open bug reports, Feb. 2011, 8 pages.*

(Continued)

*Primary Examiner* — Thuy Dao
(74) *Attorney, Agent, or Firm* — Fish & Richardson P.C.

(57) ABSTRACT

A computer-implemented system for managing software problem reports includes a registration sub-system to register software developers from multiple different developer organizations; an application store that makes a plurality of applications from a plurality of application developers available for acquisition by members of the public; an application bug tracker programmed to receive reports of problems with applications distributed using the application store, to receive data regarding the problems, and to associate the data with a particular application or developer of the particular application; and a report generator to produce one or more problem reports for a developer that has provided one or more applications, the problem reports including information about the data regarding the problems relating to particular applications submitted to the application store by the developer.

20 Claims, 10 Drawing Sheets

(56) References Cited

U.S. PATENT DOCUMENTS

| | | | |
|---|---|---|---|
| 7,234,131 | B1 | 6/2007 | Speyrer et al. |
| 7,299,455 | B2 | 11/2007 | Anderson et al. |
| 7,401,321 | B2 * | 7/2008 | Sit .................. G06F 11/3664 714/E11.207 |
| 7,458,064 | B2 | 11/2008 | Potts et al. |
| 7,509,626 | B1 | 3/2009 | Barnes et al. |
| 7,512,933 | B1 | 3/2009 | Tortosa et al. |
| 7,603,653 | B2 | 10/2009 | Sundararajan et al. |
| 7,657,872 | B2 | 2/2010 | Kelbaugh et al. |
| 7,743,360 | B2 | 6/2010 | Venolia |
| 7,870,535 | B2 | 1/2011 | Rippert et al. |
| 8,381,189 | B2 | 2/2013 | Surazski et al. |
| 8,448,138 | B2 | 5/2013 | Chang et al. |
| 8,694,969 | B2 | 4/2014 | Bernardini et al. |
| 8,826,222 | B2 * | 9/2014 | Bak ........................ G06F 8/71 717/101 |
| 8,949,770 | B2 * | 2/2015 | StClair .................. G06F 8/10 717/101 |
| 2002/0049962 | A1 | 4/2002 | Kelbaugh et al. |
| 2006/0015840 | A1 | 1/2006 | Marvel et al. |
| 2007/0011659 | A1 | 1/2007 | Venolia |
| 2007/0074149 | A1 | 3/2007 | Ognev et al. |
| 2007/0168343 | A1 * | 7/2007 | Best et al. ........................ 707/5 |
| 2008/0141221 | A1 | 6/2008 | Benesovska et al. |
| 2008/0172583 | A1 | 7/2008 | Mahajan et al. |
| 2008/0263398 | A1 | 10/2008 | Mori et al. |
| 2009/0006883 | A1 | 1/2009 | Zhang et al. |
| 2010/0205274 | A1 * | 8/2010 | Gharabally et al. .......... 709/217 |
| 2010/0325602 | A1 | 12/2010 | Kraft et al. |
| 2011/0252405 | A1 | 10/2011 | Meirman et al. |
| 2012/0167053 | A1 | 6/2012 | Marum et al. |
| 2012/0266023 | A1 * | 10/2012 | Brown ................ G06F 11/3684 714/32 |
| 2013/0104105 | A1 * | 4/2013 | Brown ................ G06F 11/3684 717/124 |
| 2014/0013307 | A1 | 1/2014 | Hansson |
| 2015/0019564 | A1 * | 1/2015 | Higginson .......... G06F 17/3053 707/748 |

OTHER PUBLICATIONS

Constantinides et al., Online design bug detection: RTL analysis, flexible mechanisms, and evaluation, Nov. 2008, 12 pages.*

Authorized Officer J.T. Kim. International Search Report and Written Opinion in international application No. PCT/US2011/037210, dated Dec. 7, 2011, 10 pages.

Avnon et al., Fit and Finish using a bug tracking system: challenges and recommendations, Apr. 2010, 4 pages, <http://delivery.acm.org/10.1145/1760000/1754219/p4717-avnon.pdf>.

Bertram et al., Communication, collaboration, and bugs: the social nature of issue tracking in small, collocated teams, Feb. 2010, 10 pages.

Bortis et al., Teambugs: a collaborative bug tracking tool, May 2011, 3 pages.

Bray. Tim. "Android Application Error Reports", May 21, 2010 [Retrieved on May 24, 2010], retrieved from the Internet <URL:http://android-developers.blogspot.com/2010/05/google-feedback-for-android.html>.

H. Delugach, An evaluation of the pragmatics of web-based bug tracking tools, Oct. 2007, 8 pages, <http://delivery.acm.org/10.1145/1330000/1324243/p49-delugach.pdf>.

Hangal et al., Tracking down software bugs using automatic anomaly detection, May 2002, 11 pages.

International Preliminary Report on Patentability in International Application No. PCT/US2011/037210, dated Nov. 20, 2012, 7 pages.

Spacco et al., Tracking defect warnings across versions, May 2006, 4 pages.

Phil Keys, "Follow after Apple", The Cutthroat Competition of Application Stores for Mobile Devices, Nikkei Electronics, No. 1018, Nikkei Electronics, Japan, Nikkei BP, Inc., Nikkei Business Publications, Inc., Nov. 27, 2009, pp. 71 to 78, 18 pages (with English translation).

Hidetake Iwata, An Analysis of Relationships between Bug Reports and Modification Costs in Open Source Development, lecture notes/software studies 31, basics of software engineering XII, Japan, Kindai Kagaku Sha Co., Ltd, Nov. 30, 2005, pp. 43 to 48 (English abstract).

Office Action issued in Japanese Application No. 2013-511363 on Jun. 8, 2015, 9 pages (with English translation).

* cited by examiner

FIG. 6C

GENERIC.MARKET.DEVELOPER@GMAIL.COM | HOME | HELP | ANDROID.COM | SIGN OUT android market HOME > COM.ANDROID.LAUNCHER2 > CRASH ERRORS >
NULLPOINTEREXCEPTION IN COM.ANDROID.LAUNCHER2

CRASH

EXCEPTION CLASS    JAVA.LANG.NULLPOINTEREXCEPTION
SOURCE METHOD      LAUNCHERMODEL$LOADER$LOADERTHREAD$10.RUN()

☑ MARK AS OLD

PLATFORMS

NEXUS ONE    15 REPORTS    15 REPORTS/WEEK

STACK TRACES

V2.2    APR 22, 2010 12:59:16 PM    15 REPORTS    15 REPORTS/WEEK

```
JAVA.LANG.NULLPOINTEREXCEPTION
AT COM.ANDROID.LAUNCHER2.LAUNCHERMODEL$LOADER$LOADERTHREAD$10.RUN(LAUNCHERMODEL.JAVA:1108)
AT COM.ANDROID.LAUNCHER2.DEFERREDHANDLER$INPL.HANDLEMESSAGE(DEFERREDHANDLER.JAVA:48)
AT ANDROID.OS.HANDLER.DISPATCHMESSAGE(HANDLER.JAVA:99)
AT ANDROID.OS.LOOPER.LOOP(LOOPER.JAVA:123)
AT ANDROID.APP.ACTIVITYTHREAD.MAIN(ACTIVITYTHREAD.JAVA:4605)
AT JAVA.LANG.REFLECT.METHOD.INVOKENATIVE(NATIVE METHOD)
AT JAVA.LANG.REFLECT.METHOD.INVOKE(METHOD.JAVA:521)
AT COM.ANDROID.INTERNAL.OS.ZYGOTEINIT$METHODANDARGSCALLER.RUN(ZYGOTEINIT.JAVA:868)
AT COM.ANDROID.INTERNAL.OS.ZYGOTEINIT.MAIN(ZYGOTEINIT.JAVA:626)
AT DALVIK.SYSTEM.NATIVESTART.MAIN(NATIVE METHOD)
```

BUG CLEARING HOUSE

CROSS-REFERENCE TO RELATED APPLICATION

This application claims priority to U.S. Provisional Application Ser. No. 61/346,453, filed on May 19, 2010, entitled "Bug Clearing House," the entire contents of which are hereby incorporated by reference.

TECHNICAL FIELD

This document relates to management and distribution of information about problems with software applications.

BACKGROUND

Software development is a difficult business. A prospective software developer must first train himself or herself in architecting and programming software. He or she must then stay up-to-date on ever-changing programming languages and technologies. And he or she must have an idea. The developer then needs to figure out how to implement the idea through programming within the resources that are available on the target computing platform, and within their own time and financial constraints. In addition, he or she needs to have people test the program in different settings, and make corrections to fix bugs in the program. The developer must then figure out how to price and distribute the software and get people interested in it.

Advanced programming environments helps to resolve some of these problems—i.e., they make the organization and typing of code more automated. In addition, the recent advent of on-line app stores for wireless computing devices such as smart phones and netbooks has made it much easier for small developers to market and sell software. Both of these developments have made life better for software developers and for the people who buy their software. Still, the life of a software developer is a hard one. For example, it can still be difficult to obtain feedback from users of a program and to analyze that feedback in an effective manner. For example, many developers provide an email link with an application by which customers can provide feedback.

SUMMARY

This document discusses systems and techniques for managing reports of problems, or bugs, for software developers, and particularly for software developers who sell and distribute applications through a third-party on-line app store for users of wireless mobile computing devices such as smart phones. For example, a developer may be an individual programmer who is registered with a system that provides a public app store, so that the developer may upload applications to the app store for the distribution of the applications to members of the public who are registered to make purchases from the app store—all in a familiar and well-known manner. The particular software applications, and/or an operating system that executes on one or more mobile computing devices, may be programmed to gather information when there is a problem, or bug (e.g., the application crashes or freezes, consumes an excessive amount of power, or a user of a device manually reports a problem or an idea for improving the application), and may transmit data about the problem to a reporting sub-system that is associated with the app store and operated by the same organization that operates the app store.

The reporting sub-system may correlate each such incoming bug reporting submission (whether generated automatically by a device or manually by a user of the device) with a computer application to which the problem was directed (e.g., an application that was open and/or the focus of an operating system when a freeze or crash occurred), and may store information that characterizes the problem. The information may be stored in a manner so that it is associated with the application, and by extension, with a developer of the application. When the developer (which may be the individual who provided the software to the app store, or an agent of that individual) next logs onto the system, the developer may pull up reports regarding software applications they have uploaded, where the reports aggregate all of the data for all the reported problems for each such software application, and also show the nature and extent of problems with the applications.

Such reports may have certain information removed from them by the reporting sub-system, such as to maintain privacy for users whose mobile computing devices experienced the problems and generated the corresponding data. The level of information that is provided by the sub-system to a developer can also depend on the level of trust that the sub-system has with the developer. Also, users may be notified regarding the level of information that may be shared, and may choose to allow or disallow such use of the information.

The reports may take various familiar forms, such as summary reports that show the frequency of occurrence of problems with an application or applications, error reports that list all problems of a certain type with an application and provide data that describes the problems (e.g., in what portion of the code the problem occurred), and stack traces that show information about the status of each computing device when the problem occurred on the device.

In addition, the system may generate data across multiple applications that is useful more broadly for the third-party provider. For example, where the organization that operates the app store also provides the operating system for the mobile devices that access the app store, problem data for multiple applications can be "rolled up" in various manners to create aggregate data and resulting reports to determine whether there are problems with the operating system. For example, if such data indicates that multiple different applications are experiencing freezes when accessing a particular operating system service or interface, the third-party provider may be alerted that there could be a problem with the code for the service or interface.

Such systems and techniques may, in certain implementations, provide one or more advantages. For example, developers may be provided with diagnostic capabilities that may otherwise be available only to sophisticated companies that have set up their own bug tracking systems, merely by using a particular development environment. Users of devices may receive improved applications from various developers, and may be allowed to report bugs in a convenient manner that is consistent across multiple different applications from multiple different developers. And a provider of a platform, such as an operating system and/or an associated app store, may be able to improve the desirability of its platform to developers and users of devices.

In one implementation, a computer-implemented system for managing software problem reports is discussed. The system comprises a registration sub-system to register software developers from multiple different developer organizations. The system further includes an application store that makes a plurality of applications from a plurality of application developers available for acquisition by members of the public. The system also includes an application bug tracker programmed to receive reports of problems with applications distributed using the application store, to receive data regarding the problems, and to associate the data with a particular application or developer of the particular application. Additionally, the system includes a report generator to produce one or more problem reports for a developer that has provided one or more applications, the problem reports including information about the data regarding the problems relating to particular applications submitted to the application store by the developer.

Implementations can include any, all, or none of the following features. The reports of problems can include problems selected from the group consisting of application crashes, application freezes, excessive battery usage, and manually-invoked computing device user comments. The system can also include a bug analyzer programmed to analyze reports of problems across multiple applications to identify whether the reports of problems indicate problems with particular computing device models or a computer operating system. The bug analyzer further can identify that reports of problems indicate problems with particular computing device models or a computer operating system by identifying statistically higher reporting frequencies with a particular device model or operating system version. The system can be arranged to limit information provided to the developer based on a trust level that identifies how much information about users of the particular application that the developer is authorized to obtain. The system can additionally be programmed to limit information provided to the developer based on whether the developer is a developer of a core application from an organization that manages an operating system for a device on which a particular problem occurred.

Also, the system can be arranged to group information about problems according to the type of problem. The system can be arranged to provide information indicating a device type and operating system identifier for a device on which a particular problem occurred. The system can further include a developer upload interface that accepts uploads of applications from developers and correlates each application with a developer account through which the application was uploaded. The system can be programmed to present to a developer, bugs sorted by a severity level that is determined from a rate at which different bugs for the particular developer.

In one aspect, a computer-implemented method for managing software problems includes receiving, at a central server system, a plurality of software application problem reports from a plurality of different computing devices that are remote from the central server system. The system further includes associating particular ones of the problem reports with particular applications provided by particular software developers. Additionally, the system includes receiving identification information from one developer of the particular developers. The system also includes, in response to receiving the identification information, providing the one of the particular developers with information describing problem reports for the particular applications managed with the central server system by the one developer.

Implementations can include any, all, or none of the following features. The software application problem reports can include reports relating to freezes, crashes, and user-generated comments. Additionally the software application problem reports can include trace data for a device that generated a particular problem report, and information about configuration of the device. The system can further include receiving software application uploads from a plurality of software developers, correlating each application to a developer account for the application, and correlating.

The details of one or more embodiments are set forth in the accompanying drawings and the description below. Other features and advantages will be apparent from the description and drawings, and from the claims.

DESCRIPTION OF DRAWINGS

FIG. 6C is an example screenshot of a detailed report about a particular failure of an application.

Like reference numbers and designations in the various drawings indicate like elements.

DETAILED DESCRIPTION

This document discusses various systems and techniques that may be used to provide feedback on the operation of software applications. In particular examples, a distributed group of software developers who are independent of each other (e.g., do not work for the same company, operate from the same domain, or share a common software development system) may upload their software applications to an app store from which various users of computing devices may review and download the applications, frequently paying to purchase or license the applications (where the respective developer will receive a share of the payment). An operating system on the devices may perform ordinary error handling of problems on the device, including by keeping stack traces and reporting such information to a central server system when there is a problem, or bug, with a device. Such information is commonly used by trained individuals in an attempt to diagnose the source of the problem so that remedial measures may be taken and the relevant software code may be corrected and updated.

In the examples discussed here, a portion of the data submitted from the various computing devices may also be made available for review by the developer who submitted the code that caused the problem or was active when the problem occurred. Such an operation may occur by the operating system identifying the relevant application or applications when a problem occurs, and submitting, to a central server system, information about the problem along with information that identifies the application or applications. The central server system may then store the data in association with a software application identifier, and such an identifier may be further used to identify a developer of the application. When such developer (which may be a wholly different individual or organization than the operator of the app store or operating system) logs into the system and asks for a report of problems with his or her code, the system may query a database where the problem data is stored, to locate all data for the particular developer, and may generate one or more reports that filter and group the data in various ways. As one example, personally identifiable information may be removed from the data that is provided for the report or it may be obscured. Also, the data may be sorted according to each application so that a developer can quickly obtain an understanding about the relative operation of each of their applications if they have many such applications.

Figure 1A:
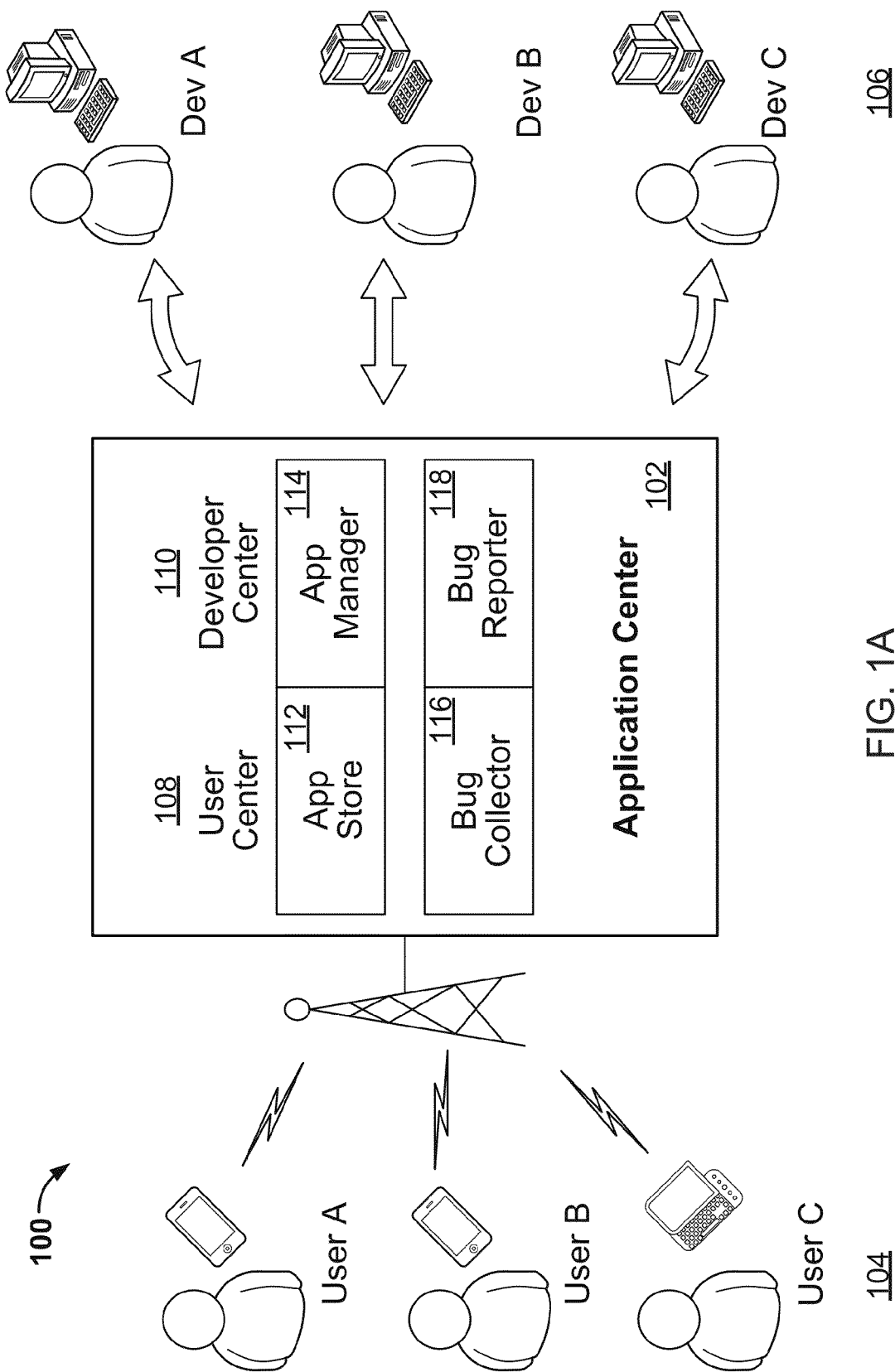
FIG. 1A is a conceptual diagram of an example system for distributing software from multiple developers and collecting information about the operation of the software.

FIG. 1A is a conceptual diagram showing a system 100 for distributing software from multiple developers and collecting information about the operation of the software. In general, the system 100 includes a central server system that sits between a group of developers and a group of users (where, of course, certain of the developers may also be users, and vice-versa). The central server system receives software code uploads from developers, provides code downloads to users, receives error or problem data from the users, and filters and organizes such data for presentation to the developers.

Referring now more specifically to the figure, the central server system is shown here in the form of an application center 102. The application center 102 includes physical and logical components that make up a user center 108 and a developer center 110. Such components may include, for example, front ends or web servers that generate user interfaces for providing services to users and developers, respectively. The user center 108 communicates with users 104, who are each individuals in this example who have acquired a mobile telephone, or app phone, that runs a particular software operating system developed by the operator of the application center 102. As part of the overall service provided with the operating system, the operator makes the application center 102 available for the review and purchase of software applications for the mobile devices. Thus, for example, User A (e.g., a teenager) may have downloaded a number of videogames, while User B (e.g., a businesswoman) may have downloaded various business applications that make use of hosted cloud-based computing platforms, and User C (e.g., a college student) may have downloaded an e-book reader application (with a number of e-book textbooks) and a variety of test preparation application, along with a mathematical modeling application. In each situation, the relevant user may launch each of their downloaded applications (which may supplement applications that were shipped with their telephone) and interact with them in familiar manners. They may also revisit the application center 102 to locate and download additional applications, as the need may arise.

From time to time, problems may occur on each of the users' 104 devices. For example, a user may be running a number of applications simultaneously, and may create a memory overflow condition that causes one of the applications to crash. Alternatively, an application may perform an operation that causes it to lock up, so that a user will need to close out a process in which the application is executing. Alternatively, a user of the device may invoke a problem submission process by which the user is allowed to fill out a form to identify an error in an application or to suggest improved features for the application. Each of these instances and similar instances will be described collectively here as bugs, in that they indicate a problem with the software application for which feedback needs to be given to the developer of the application (though it may be determined that the problem is, in the end, attributable to the operating system, the device hardware, or another application).

As shown here, the applications may be acquired from the app store 112, which may take a familiar form, such as a web site from which applications submitted by third-parties (in addition to some first-tier applications submitted by the operator of the app store 112) can be displayed as part of a web page on which are also displayed controls that, when selected by a user, cause the particular selected application to be supplied or downloaded to a device that is logged into the user's account with the system 100.

The user center 108 also includes a bug collector 116, which includes components for automatically communicating with the instances of the applications that are distributed to the users' 104 devices either directly, or via operating system components that report on the operation of the instances of the applications. The bug collector may also reformat the collected information for persistent storage, such as by arranging the data in one or more databases that include information such as the time and date of a submission, the operating system and version on the device, the make and model of the device, other applications that were executing on the device when the problem event occurred, traces of recent device activity, configuration data for the device, and other similar information.

The other "side" of the application center 102 points toward developers 106, which, like the users 104, may be very large in number and geographically dispersed. In particular, the users 104 and developers 106 may be spread across the world and may access the application center 102 through various networks, including the internet. As one example, the system 100 may have thousands or tens of thousands of active developers 106, and hundreds of thousands or millions (or even hundreds of millions) of active users 104. The techniques described here work particularly well in such systems with large developer bases, as more user data may be supplied to each developer, and developers in such systems are more likely to be small, and not able to develop bug reporting systems of their own.

The first main component in the developer center 110 is an app manager 114. This component may be the flip-side of the app store 112 for users. In particular, the app manager 114 can include a web server and associated software that developers may access, and interact with, in order to register themselves as legitimate developer members of the system 100, and to subsequently upload code for applications that they have authored or for which they are managing the commercial distribution. The app manager 114 may also provide a number of additional services, which are generally well known, for interacting with developers and allowing the developers to conveniently manage their applications The bug reporter 118 serves as the developer-side counterpart to the bug collector 116, and completes the software distribution and feedback cycle that starts at the developers 106, moves to the app manager 114 and the app store 112, then to the users 104 who acquire and execute the applications, and back to the bug collector 116, bug reporter 118, and developers 106, when a problem arises with the software (though optimistic developers would refer to them as opportunities).

The bug reporter 118 in particular may provide for a web server system to interact with the developers 106 and a report generating facility to provide data about problems experienced by the users' 104 devices, with respect to applications that correspond to the respective developers. The reports may be of a standard or custom format. Standard reports may be developed by the operator of the application center 102 (which is shown as a single entity here, but could be operated by multiple different organizations working in cooperation with each other) and may be accessed and generated easily by developers looking to see how their respective applications are performing. Custom reports may be formed by each individual developer, and may use graphical report development tools that are well known. For example, a developer may select particular fields of data they would like to see in their reports, and may define the visual look of their reports. They may also receive reports in the form of raw data (both in batch form and in real time as reporting incidents occur among the users 104), and may use their own facilities to manipulate and report on the data. In addition, developers 106 may define aggregate reports that they would like to see. For example, if they have developed a suite of products (e.g., a business productivity suite), they may want a report that includes a section for parameters that are common to each component of the suite, and separate sections for each of the components and data that is specific to the particular component.

In these manners, the system 100 may provide developers 106 with extensive and helpfully formatted data concerning bugs in their software that may need attention. A particular developer may need to do nothing with respect to their software in order to get certain data (other than providing a mechanism by which an operating system can identify the application when it is executing). In certain instances, developers may cause additional data to be reported, such as via an API, but again, the developer would not need to implement a full system for receiving bug submissions, for gathering data on the client devices, and for otherwise implementing a full application maintenance system. As a result, entry level developers may gain the benefit of a program for improving their applications, and consumers of the applications may in turn benefit.

Figure 1B:
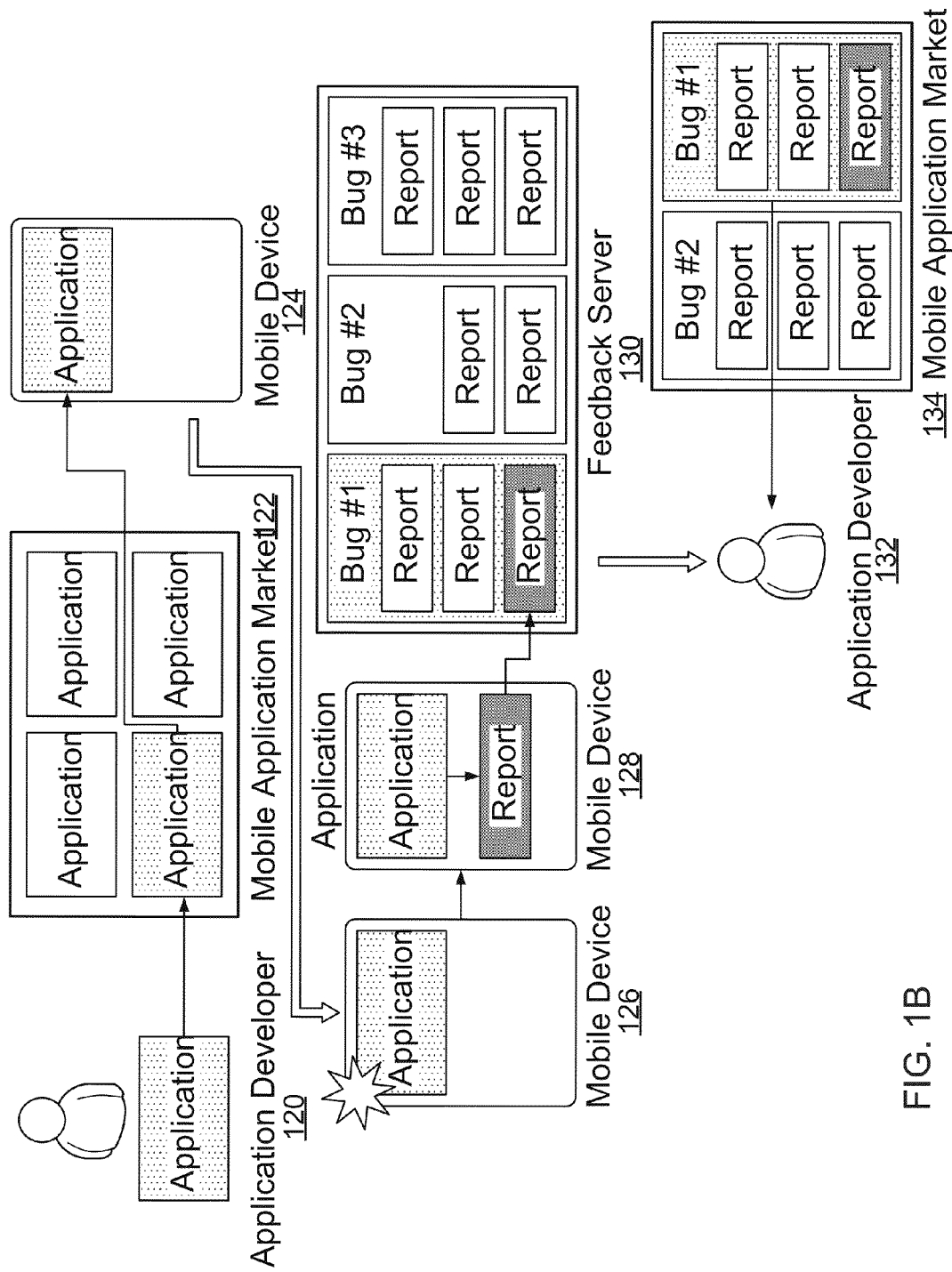
FIG. 1B is a flow diagram that shows operations for providing feedback on the operation of software applications.

FIG. 1B is a flow diagram showing operations for providing feedback on the operation of software applications. In general, a graphical timeline is shown here, starting in the upper left corner and ending in the lower right, to explain an example by which an application developer can make his or her software application available to the public and may receive feedback on the operation of the application, and may thereby readily and quickly improve the application.

At operation 120, an application developer submits an application to a mobile application market. The submission may occur in a variety of appropriate manners, and the developer may provide the application with a self-signed certificate that helps to legitimize the application and provide security in the system. Operation 122 shows the presence of the application in the mobile application market, along with three other applications that may have been previously uploaded by the same developer or by other developers. The "ownership" of the applications may be maintained by correlating the application to an account of the user who uploaded the application, which would ordinarily be the actual developer or someone working on behalf of the developer.

At operation 124, a user of a mobile computing device (e.g., a smart phone or app phone) has visited the mobile application market and has identified himself or herself, by being logged into the system under his or her account. The user has then selected the application that was uploaded at operation 120, and the application has been installed and made ready for execution by the user of the mobile device, in a manner that is well known.

At operation 126, an icon of an explosion indicates the occurrence of an error while the application is running on the mobile device. The error may involve a crash or locking situation, or could result from a user of the device manually indicating an intent to provide feedback regarding the application. Such an event may cause diagnostic information about the event to be gathered on the device, such as by an operating system component that executes on the device.

At operation 128, a report regarding the error is generated on the mobile device 128—an action that may occur under the control of an operating system that managed the operation of the mobile device and the various applications on the device. For example, an operating system may be programmed to recognize when a process ends unsuccessfully on the device, and such an event may trigger a number of data gathering and formatting operations by the operating system. For example, the current contents of traces, stacks, resisters, or other entities may be determined, as may identifiers for all software components that were executing on the device when the error occurred. Such information may then be gathered together into a predefined packet of information according to an agreed-upon standard.

At operation 130, the report or submission is shown as it may exist, at least conceptually, on a central server system that is tasked with tracking and reporting on such reports. In this example, the report has been classified as corresponding to a particular bug for the application, where three different bugs have been identified. Such classification may occur, for example, by identifying which piece of code was executing when the relevant error occurred, and providing an identifier for that piece of code, so that the particular reports may be joined together in producing a bug report. Identification of bugs to be assigned to particular error submissions may be performed in other ways also, including by manual classification by a user of the bug tracing system. As shown here, two other bugs have been identified, and there have been two and three error submissions, respectively, for those bugs. Thus, in this example, over a period of time, the initial application has been identified as corresponding to eight different error submissions.

Such information may be important for the developer of the application to know. For example, one of the three bugs may be important to the satisfaction of users of the application. If the developer could quickly see the nature of such a bug, the developer might be able to correct it quickly and supply a "patch" for the code (and the patch may be pushed out automatically to all users who have downloaded the application (though they may be given the opportunity to reject such an update).

At operations 132 and 134, such a developer has chosen to see a report regarding all that developer's bug submissions. In this example, there are three bugs being tracked in the entire system, but as shown in operation 134, only two of the bugs were associated with the application from operation 120. The mobile application market or similar sub-system, in this example, may thus readily generate a report that shows information about the particular errors and information that identifies to the developer the nature of the bug that is being tracked by the system.

In certain instances, the data provided in the final report may be substantially different than the data uploaded in the submissions from the mobile devices. For example, personally identifiable information may be stripped from the uploaded data, so that developers cannot make particular determinations about the users of devices. In one example, only stack traces and similar information about the device at the time of the crash may be provided but other information (e.g., information that might reflect the data the user was manipulating when the problem occurred), will not be passed. Also, certain levels of detail may be relevant to the central system, but may be irrelevant to most developers, and may thus be stripped out of the report at operation 134.

Figure 2:
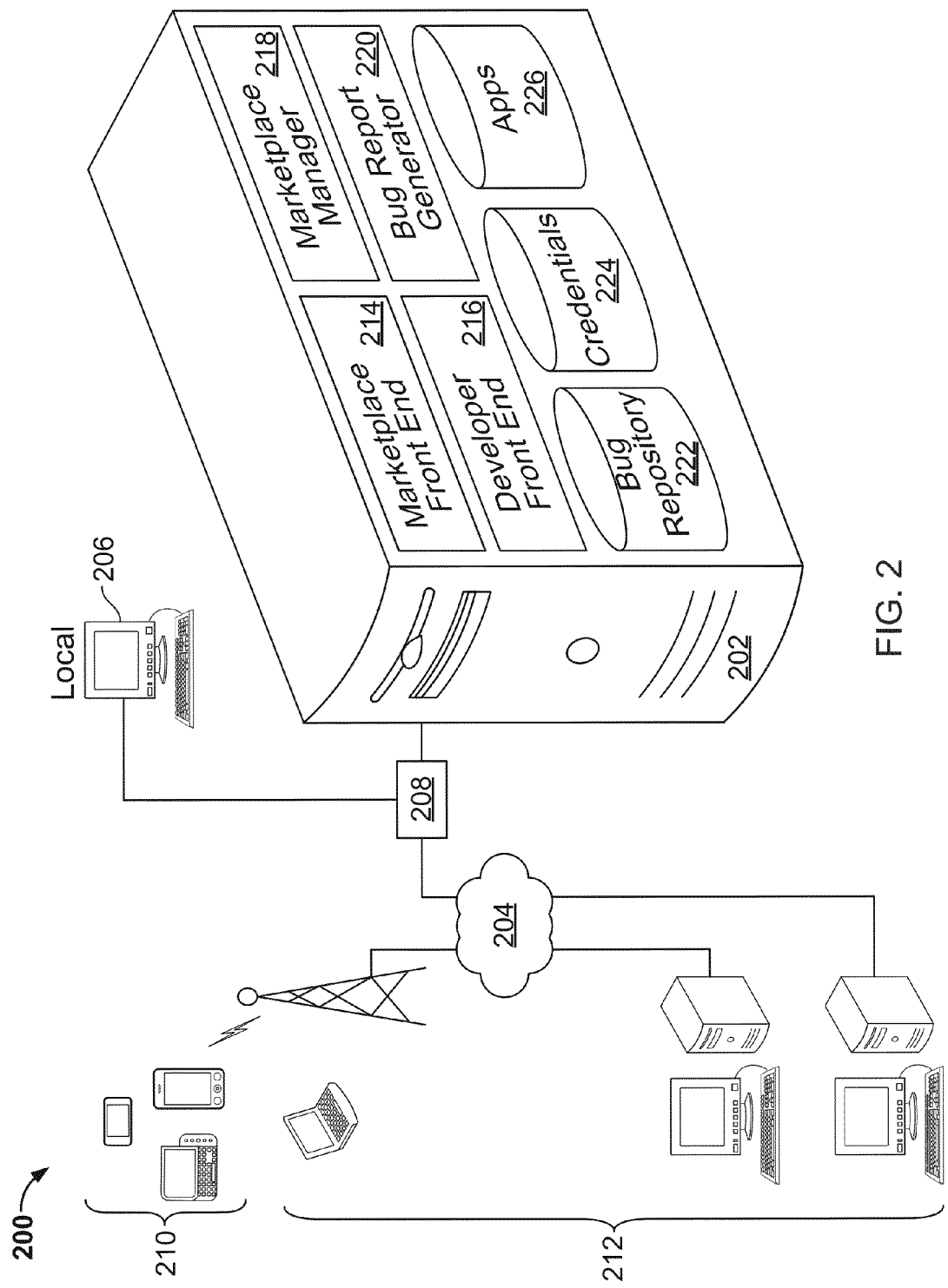
FIG. 2 is a schematic diagram of an example system for tracking submissions from computing devices regarding the operation of software applications on those devices.

FIG. 2 is a schematic diagram of a system 200 for tracking submissions from computing devices regarding the operation of software applications on those devices. The system 200 may be used to carry out actions like those discussed with respect to FIGS. 1A and 1B above. The system 200 is shown for clarity in a highly simplified form, and in a particular physical implementation may include a large number of additional components.

Referring now to the figure, there is shown a system 200 by which various developers 212, shown by example using laptop and desktop computers, may submit applications to an app server system 202, and may receive in return money and feedback about the operation of their particular respective submitted applications. Such applications may be purchased or otherwise obtained by a variety of users 210 who are shown here via wireless mobile devices that are capable of downloading and executing the applications.

The developers 212 and users 210 (or more technically, their devices) generally do not communicate with each other directly, but may instead communicate through the app server system 202, using a network 204 such as the internet. Such open communication may allow a wide variety of developer types and users to make use of the system 200.

Particular components in the app server system 202 may provide for functionality in deploying and tracking the use of software applications by the system 200. For example, a marketplace front end 214 may generate a user interface that displays available applications to the users 210, and allows the users to review, try, and download such applications. A marketplace manager 218 may provide back end support for the marketplace front end 214, such as by tracking purchases, generating billing to the users 210 and remittance to the developers 212, and other well-known functions of an app store implementation.

A developer front end 216 may generate a user interface that permits developers to register with the system 200, upload applications, manage their applications (e.g., update, add, and delete applications, and see how much money they have made selling applications), and receive feedback on the operation of their applications, as described above and below. In providing such feedback, the front end 216 may access a bug report generator 220, which may manage the uploading of data from mobile device on which bugs have occurred (e.g., as identified by crashes, freezes, and manual user reports). For example, the bug report generator may be responsible for receiving bug report data from the user devices, formatting it appropriately for storage, such as in bug repository 222, and then retrieve all or part of the stored data when a developer requests to see reports regarding his particular applications.

The bug report generator 220 or the developer front end 216, or a combination of the two, may filter and format such data appropriately for delivery to a developer. For example, the two components can cooperate to generate a web page and send the page to the developer in response to a developer's request for a report. Likewise, the data may be effectively streamed to a developer who has asked for a syndicated feed of data, so that the developer may see bug reports in real time as they arrive at the system 200. Such real time reporting may occur in various manners, such as SMS messages to the developer, XML transfers (so that, e.g., the developer may use analysis tools in its own system to organize the various bug reports), and other such mechanisms.

Various data stores are also shown in the figure to exemplify forms of data that may be stored, accessed, and managed by the system 200. For example, as noted above, a bug repository may store information about bug reports that have come up from users 210. The bug information may include diagnostic information that would allow a developer or other technical person to infer (at least in part, and at least some of the time, or in combination with other bug reports) what went wrong when the bug event occurred. The bug repository may also, in certain circumstances, include information that should be accessible internally to the system 200, but not to developers 212. Such information may be filtered in appropriate manners by, for example, bug report generator 220 and/or developer front end 216.

A credentials database 224 may store credentialing information for the developers 212 and users 210. The credentials may allow the various people to access relevant information that is associated with their accounts, and to pay or receive money for the purchasing and selling of applications through the system 200. Also, credentials may be used to determine an appropriate level of access by a particular user to certain data. For example, a third-party developer may have their credentials associated with a limited access level, so that when they request reports on bugs with their applications, personal information is filtered out so as to maintain anonymity for the users of the applications. In contrast, inside users may have greater access to data about faults on the user devices.

Finally, an apps data store 226 stores applications that are made available to the users 210, including apps that have been uploaded by the developers 212, and apps that may have been placed on the marketplace initially by the operator of the system 200.

Outside of the server system 202, a local developer 206 is also shown in this example, and may be within the same domain as the app server system 202, and communicate over a private network 208 with the app server system 202. The local developer is a programmer who is trusted by the app server system 202 operator, such as an employee of the organization that runs the app server system. Such a user may be identified by the app server system 202 in a variety of manners, and the developer front end 216 may thus provide the developer 206 with greater access to error data and access to more powerful tools for analyzing the data. In other words, the developer 206 may be treated by the system 200 as a developer, but as being different than the other developers 212.

As one example, certain of the users 210 may have consented to having certain personally identifiable data provided to the organization that provided the app server system 202, but may have declined to have such information shared with third-parties. The local developer 206 would be able to access more information in such a situation than would developers 212. Such a situation may be particularly desirable from the viewpoint of the users 210, because frequently the local developer 206 generates some of the most useful and universally deployed applications in a system (e.g., word processing and electronic mail), and users may want to give such developers everything they need to improve the programs.

Figure 3:
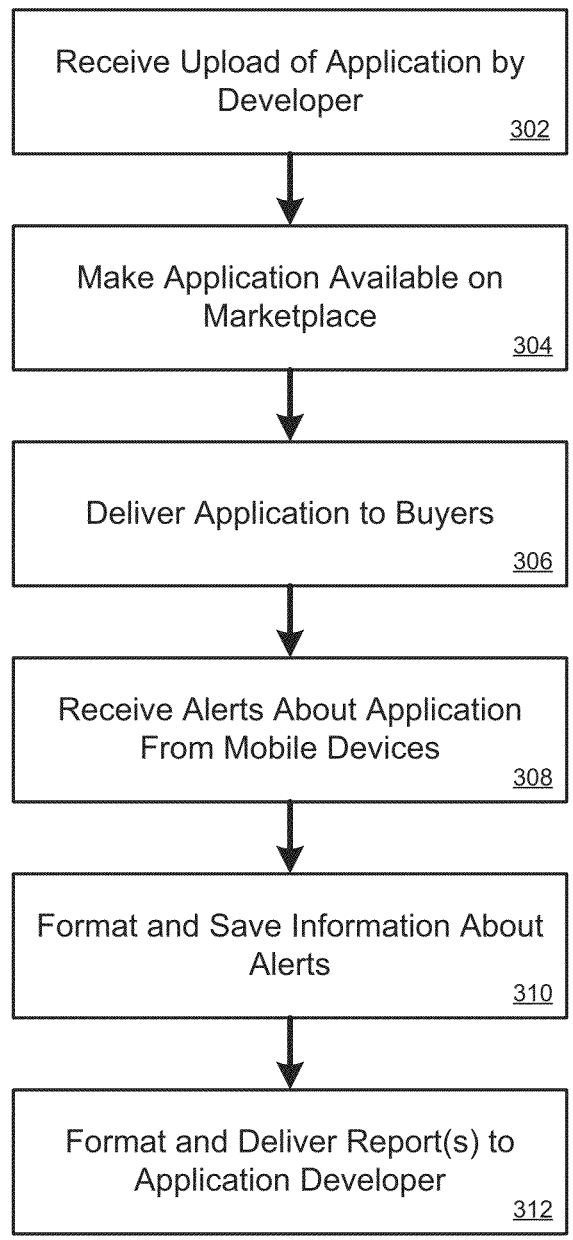
FIG. 3 is a flowchart of an example process for managing software problem reports.

FIG. 3 is a flowchart of a process for managing software problem reports. In general, the process involves receiving computer code for various computer applications from developers of the applications, and making the applications available for download and perhaps for purchase by members of the public at an application marketplace. After the various applications are installed on various computers for registered users of the system, the applications may begin to generate alerts (e.g., when there is a crash or other problem), information about such alerts may be relayed back to the operator of the application marketplace, and the information may be made available to the corresponding developer who submitted the particular applications that had the events, so that that developer may improve and edit the code for his or her applications.

The process begins at box 302, where the process receives an upload of applications by a developer. The developer may be, for example, an individual programmer working out of his home, who has written a simple application to solve a particular niche problem in a particular field, such as a calculator for carpenters, a search tool for a particular profession, or other similar applications that may be executed on a mobile computing device. The developer may alternatively include a group of individuals, such as a small software company that makes its business out of developing applications such as those sold on the application marketplace. Generally, the developer is the party who has a rightful claim to revenue generated by selling the application, or benefit derived from otherwise distributing the application to various users.

At box 304, the application is made available on the marketplace. Such operation may occur in a familiar manner, and may include the posting of an icon and a textual description of the application, both of which will have been provided to the marketplace by the developer. The application may be made available for purchase for payment, or may be made available for free download, which is also well-known in the art.

At box 306, instances of the application are delivered to buyers who communicate an interest in receiving a copy of the application. As a result, a copy of the application may be downloaded to a mobile device associated with the user account of the user who is accessing the application store or marketplace. The user may then take appropriate actions to install the application and to get it executing on their device, either at the same time they purchased it, or at a later time or times. Thus, the user of a device who has downloaded a particular application, and other users who have downloaded the application, may access the applications and interact with it as they see fit.

Such interaction with the application may raise problematic issues with the operation of the application. One such issue includes a malfunction of the application that may lead to a crash or a hang up of the application (or the process in which the application is executing). Another issue may be a dis-satisfaction with the application by the user, either because the application is performing incorrectly or because the user believes that the application could perform better with certain improvements. In such a situation, a particular client device for the user may gather data either automatically from the device or manually from the user to characterize the parameters of the event. The various data described above may be gathered, in certain implementations, by a component of the operating system or the application, and include information like that discussed above, in addition to other data such as a current screenshot of the device at the time of the event, and also information that might be input to the device by the user of the device, such as words indicating the sort of feature that a user would like added to the application. Once such diagnostic information has been gathered, it may be transmitted from the client device to a server system, which may then format and save the information about the alerts and other alerts received from other client devices (box 310).

In performing such formatting and filtering, the central server system may also identify common parameters between data for different events in an effort to identify events that represent the same bug occurring for an application. For example, if trace information for two different events matches very closely to each other, the system may infer that both events were the result of a common bug. Certain parameters for determining whether two events result from the same bug may be weighted, while other parameters may be determinative of whether the bug to which the event is classified relates to a particular parameter. Each of such identified bugs may be assigned an identification number that may be used subsequently to create a correlation between different alert data that is determined to have a common bug, and to provide for group recording of alerts and bugs to developers of software in the system.

At box 312, the process formats and delivers, to a developer of a particular application or applications, bug information about their corresponding application or applications. As discussed above, a report may take a variety of forms, including a printed report on the webpage, a block of data such as in XML format, or a stream of data that involves a data transmission every time an event is reported or a group of events are reported to the process by various client devices that are running an application. In this manner, a developer may obtain, and a user and/or user's device may provide, information about bug-created events that occur on the user's device.

Figure 4:
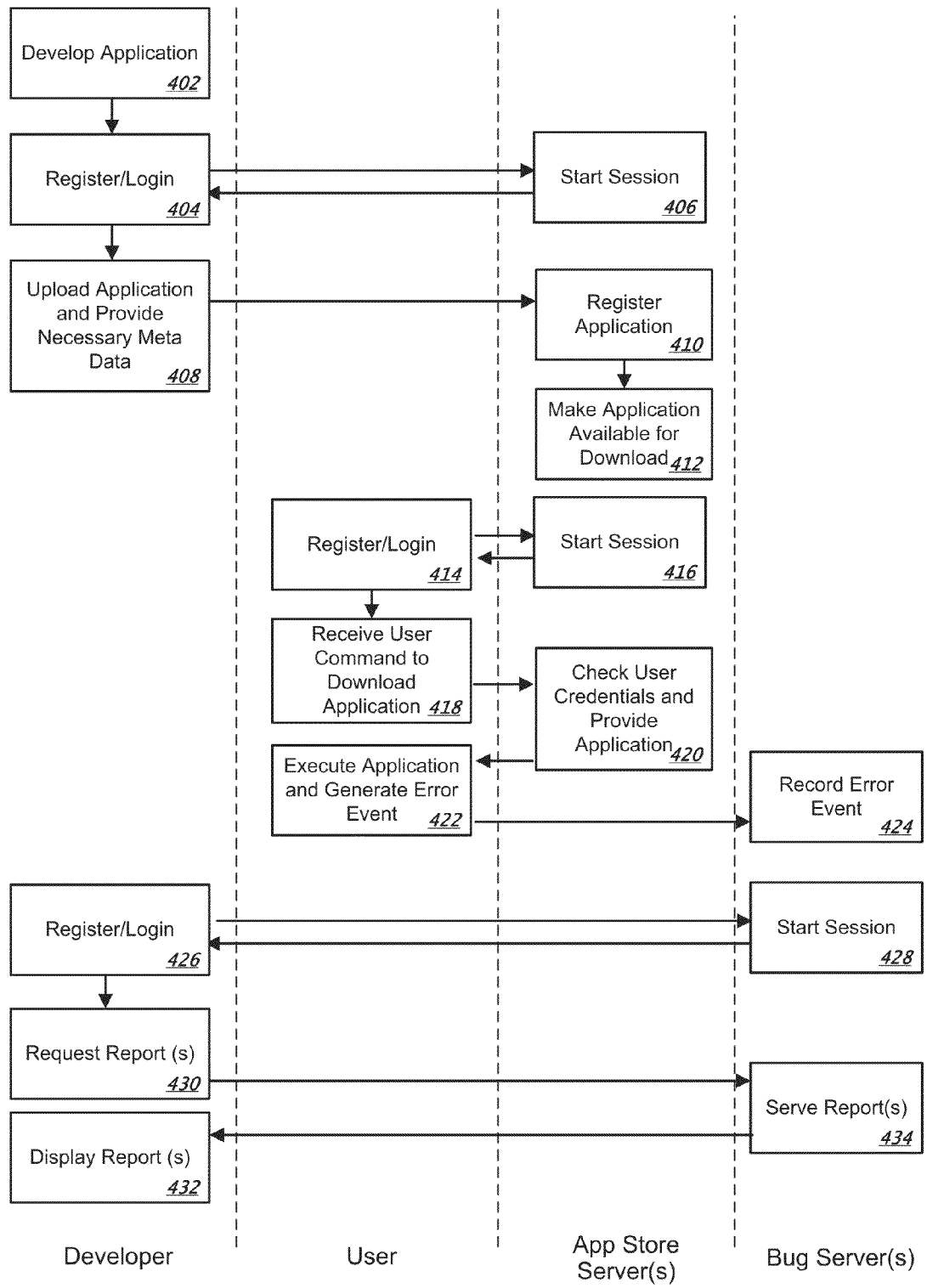
FIG. 4 is a swim lane diagram of an example process for managing submissions of problems with software from multiple developers.

FIG. 4 is a swim lane diagram of a process for managing submissions of problems with software from multiple developers, where the software is installed across multiple mobile computing devices. This process is similar to the process of FIG. 3, but shows more detail about particular example operations that may be performed by particular components in a system. The process begins at box 402, where a developer develops a software application. Such development may include architecting the application, drafting code for the application and packaging and otherwise arranging portions of code for the application. Once the application is ready to be used, the developer may register and login (box 404) to an application store server system in a familiar manner, and the server system may start an interactive session with the developer in this manner (box 406). After providing appropriate forms of metadata regarding the application, such as a title for the application, a price to be charged for the application, it is textual description of the application, the icon for the application to be presented on a user's device and on applications store, and other appropriate data, the user or developer may upload their application or applications with the necessary metadata (box 408).

At box 410, the applications store servers register the application, create a space for storing it, along with the data that describes parameters of the application, and host the application in an available manner on the applications store.

At some later point in time, a user who is browsing the applications store finds the application and wants to purchase it. At box 414, the user registers and logs in with the applications store, which in turn starts a session with the user (box 416).

At box 418, the user supplies a command to download the application, such as by clicking on an icon for the application, and then selecting a particular on-screen selectable control to confirm that the user wants to purchase and obtain the application. At box 420, the application store checks the user's credentials to ensure that the user has an account with the applications store, and then provides the application to the user if the user does have such an account. Alternatively, the servers may determine that the user does not have an account, and may request such information from the user in a conventional manner, including by requesting credit card information from the user for paying for downloaded applications in the future.

Once the user has downloaded the application, they may begin using it, and such use may, in certain circumstances, generate an error or problem event, as shown at box 422. Examples of error events are provided above, and may include freezing of the device, crashing of the device, or manual reports from a user regarding suggested improvements or problems with an application. The user's device then reports such an event, along with diagnostic information for the event, to a bug server at box 424, where the data may be received and recorded. Such transmission from the client device may occur via operating system components, by the particular application suffering the event, or by a different application that is resident on the device. The particular interaction between the device and the bug servers may be established by an API standard, and may follow that standard so that the data is transferred appropriately.

The process may then wait for a while, and other users may execute applications on their devices, which may in turn report data about problems on those devices. At some later point, however, the developer may wish to see if the application is operating properly, and may thus login (box 226) at the end, though this time, he may be provided with information from the bug servers, which may start a session at box 428. One common interaction may include a request for one or more reports (box 430) made by a computing device operated by the developer, and the bug servers, at box 432, may serve the requested report back to the developer. Such serving may include organizing error events data according to particular posts that have been identified by the bug servers, and filtering data so that the developer receives only the data they need in order to make an informed decision, and so they do not receive data that they should not have access to. Finally, at box 434, the developer's device displays the records or reports, such as on a web page, so that the developer may review them and may make decisions about whether and how to update their software in order to address errors that may have been occurring on one or more devices.

Figure 5B:
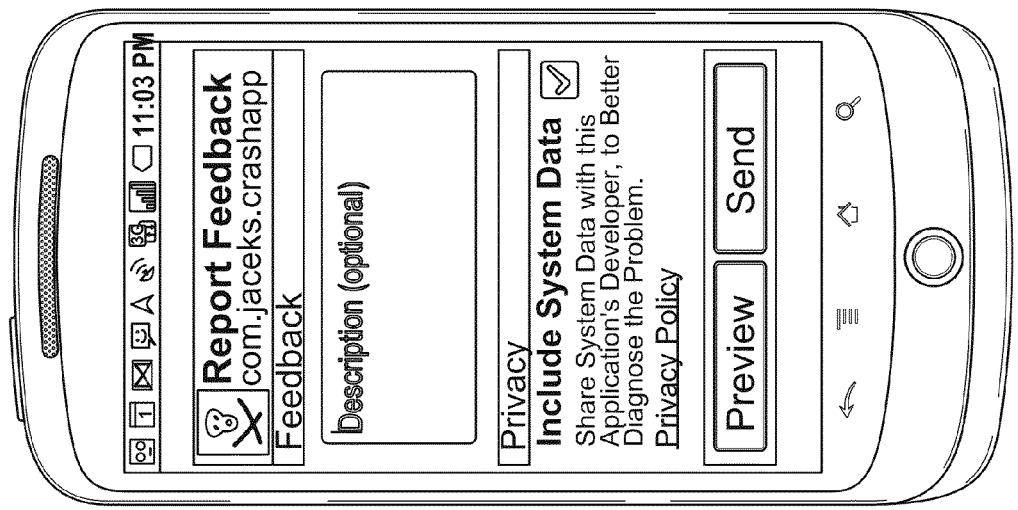
FIGS. 5A and 5B are example screen shots of a mobile computing device experiencing operational problems with a software application.
Figure 5A:
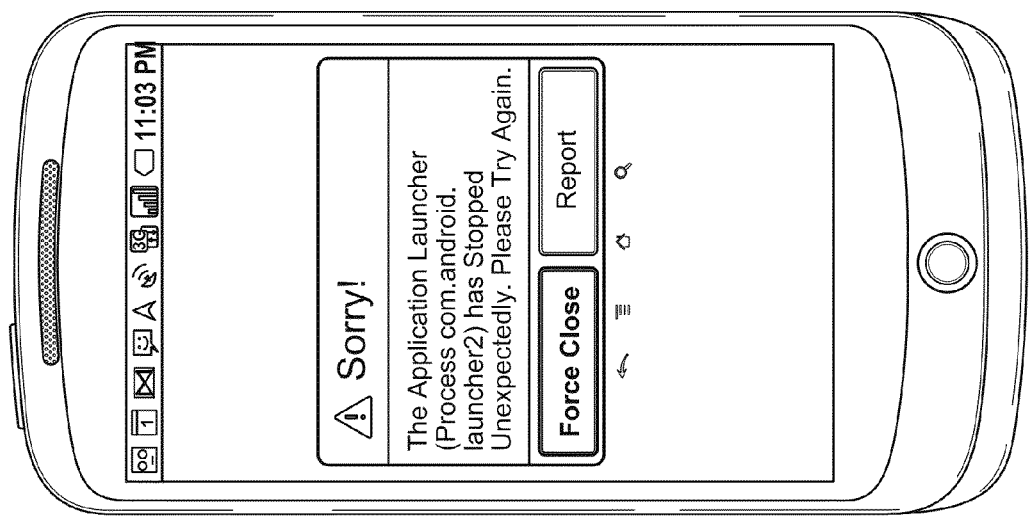

FIGS. 5A and 5B are example screen shots of a mobile computing device experiencing operational problems with a software application. In general, these screenshots show two examples of screens that may be generated on a client device, such as by an operating system component or by an application, when an error event occurs. The screen shot in FIG. 5A shows a warning screen that has been generated because a particular process has stopped unexpectedly. The screen shot instructs the user about what has happened, and then gives the user two options for responding. In particular, the user can select "force close" to shut down the process, and by extension shut down the application, with the understanding that they could lose data doing so. The user may also select to report information about the problem, where the user is open-minded and wishes to help the developer of the application or the operating system improve the software so that similar unexpected stoppages do not occur in the future.

The user's selection of the "report" option causes the screen shot of FIG. 5B to be displayed. Here, the user is shown parameters that control how the problem will be reported to a central server system. In particular, the appropriate privacy policy to be applied to the transmission may be displayed for the user's review, and the user may be provided with appropriate controls for correcting or updating the privacy policy. In addition, the user is presented with an empty text box where he or she can optional describe the context of the problem—e.g., "I was typing xyz into the abc application, while simultaneously talking on the phone, converting a video with Handbrake, doing number-crunching for SETI, and playing a full res first person shooter, when for no good reason, the application hung up on me". Such text may be passed as a field with other diagnostic information about the problem. In certain circumstances, a user could be given the opportunity to have their contact information provided to the developer in case the bug is particularly thorny and the developer needs to email or call the user. Alternatively, the user may not be asked initially to provide any contact information, but the developer, upon reviewing the comment, could place a request for contact information, and the system would then generate a message that thew user could respond to.

The user may then select the "preview" button to be given a view of all the data that will be uploaded about the problem, or "send" to cause such upload of the information.

Figure 6A:
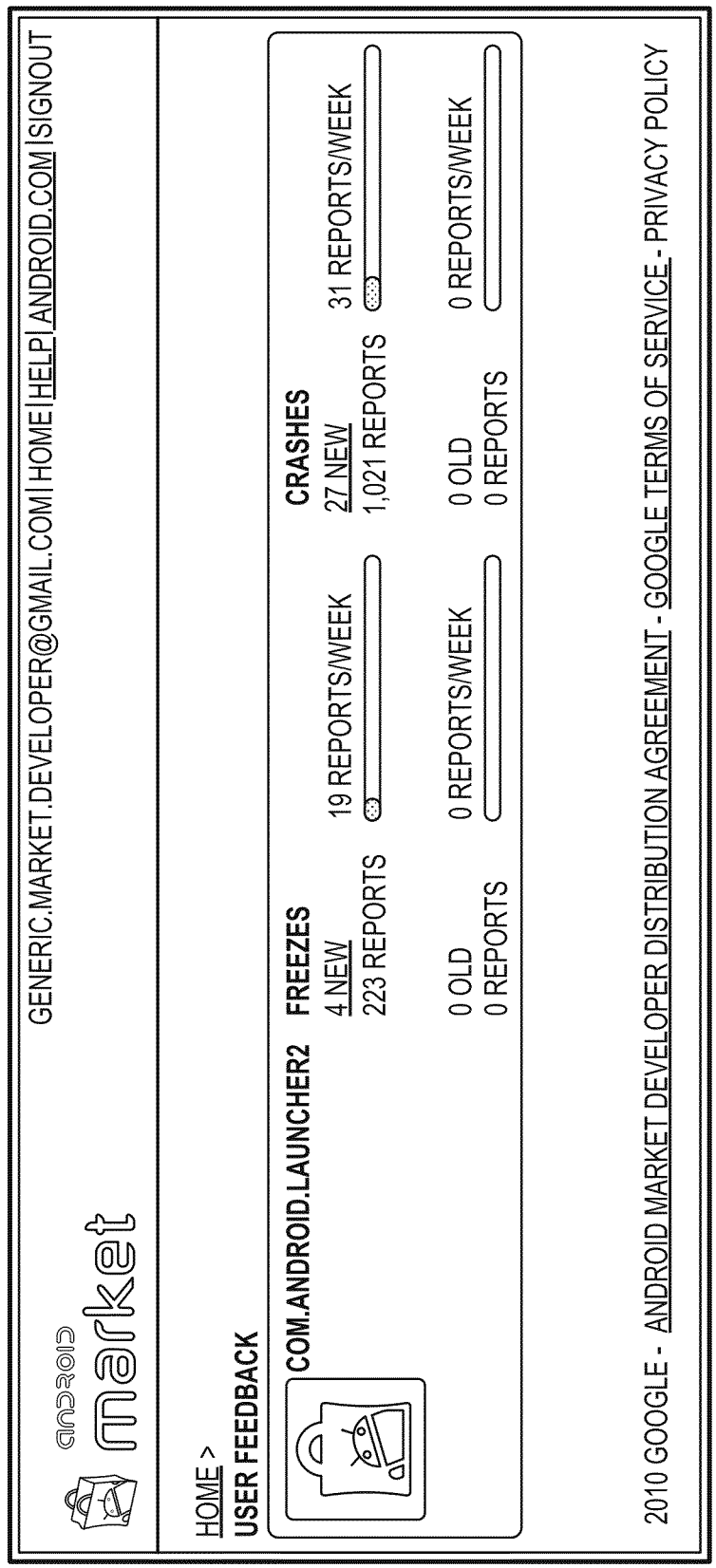
FIG. 6A is an example screenshot showing summary statistics of operational problems for an application.
Figure 6B:
FIG. 6B is an example screenshot showing a summary report of operational problems for a number of different applications or code files.

FIGS. 6A-6C are example screen shots of developer reports generated by a software tracking system. FIG. 6A shows summary statistics about bugs for the application com.android.launcher2. For example, the total number of reports or submissions from client devices is show, as is the current rate of submissions—both for freezes and crashes.

In another instance, information about device battery power and usage may be reported with information about executing applications. For example, if a battery falls in power suddenly, diagnostic information may be uploaded from the device so that a central researcher can determine the source of the electoral demand. For example, if a particular application is frequently shown as being active whenever such events occur, a central system might infer that that application is the source of the battery drain.

FIG. 6B is a similar summary report, though for a number of different applications or code files. For example, the name of the code is shown along with its context when it failed, the number of reports for such failing, and current rate of such events.

FIG. 6C shows a more detailed report about a particular failure of a particular application, and shows much more information about the context of the failure. For example, the stack traces for the device are shown in the report, as is certain other helpful information. Some of the information may be hyperlinked so that a user may see additional source data for what is displayed here.

Figure 7:
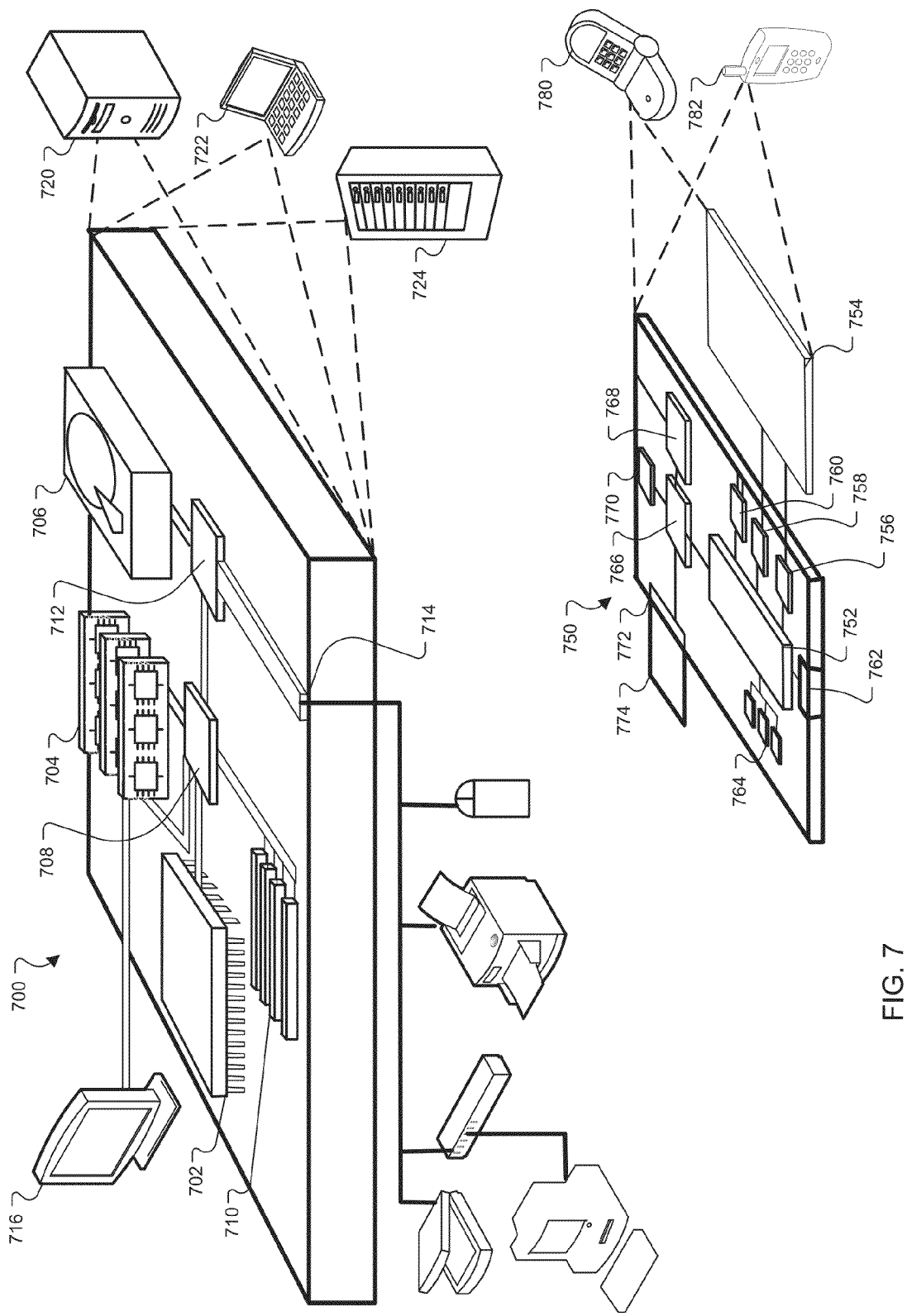
FIG. 7 shows an example of a generic computer device and a generic mobile computer device that may be used with the techniques described in this paper.

FIG. 7 shows an example of a generic computer device 700 and a generic mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, memory on processor 702, or a propagated signal.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, memory on processor 752, or a propagated signal that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to a telephone dialing application, but other forms of applications and keypad layouts may also be addressed, such as keypads involving graphical icons and macros, in addition to alphanumeric characters.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method, comprising:
obtaining, at a computing system, information that identifies a plurality of applications that are to be distributed to user devices through an on-line application store operating on the computing system, the plurality of applications provided to the computing system by a plurality of application developers;
receiving, at the computing system, requests from a plurality of user devices to download particular ones of the plurality of applications through the on-line application store;
in response to receiving the requests from the plurality of user devices to download the particular ones of the plurality of applications through the on-line application store, providing the particular ones of the plurality of applications to corresponding ones of the plurality of user devices that requested the particular ones of the plurality of applications;
receiving, at the computing system, problem reports from particular ones of the plurality of user devices, the problem reports indicating application bugs detected while running applications distributed through the on-line application store on the particular ones of the plurality of user devices;
associating, by the computing system, a portion of the received problem reports with a first application developer among the plurality of application developers based on the portion of the received problem reports indicating application bugs that were detected while running applications provided to the computing system by the first application developer;
generating, by the computing system, a consolidated bug report for the first application developer that characterizes the portion of the received problem reports associated with the first application developer; and
providing the consolidated bug report to the first application developer.

2. The computer-implemented method of claim 1, wherein:
the plurality of applications are finished releases of the plurality of applications, and
the on-line application store is arranged to make accessible the finished releases of the plurality of applications for download and purchase by members of the public, including by users that are not affiliated with the plurality of application developers.

3. The computer-implemented method of claim 2, further comprising:
receiving, at the computing system and in conjunction with receiving a first of the requests from a first of the plurality of user devices to download a first of the particular ones of the plurality of applications through the on-line application store, authorization to charge a fee for the first application to an account associated with the first of the plurality of user devices that requested to download the first application; and in response to receiving the authorization to charge the fee for the first application, causing, by the computing system, the fee for the first application to be charged to the account associated with the first of the plurality of user devices.

4. The computer-implemented method of claim 1, wherein the on-line application store is operated by an organization that is separate and independent from the plurality of application developers, wherein the requests received from the plurality of user devices to download particular ones of the plurality of applications through the on-line application store are requests initiated by users that are separate and independent from (i) the organization that operates the on-line application store, and (ii) the plurality of application developers.

5. The computer-implemented method of claim 1, further comprising:

associating, by the computing system, a second portion of the received problem reports with a second application developer among the plurality of application developers, other than the first application developer, based on the second portion of the received problem reports indicating application bugs that were detected while running applications provided to the computing system by the second application developer;

generating, by the computing system, a second consolidated bug report for the second application developer that characterizes the second portion of the received problem reports associated with the second application developer; and providing the second consolidated bug report to the second application developer.

6. The computer-implemented method of claim 1, wherein the portion of the received problem reports associated with the first application developer includes problem reports for a particular application reported to the computing system by multiple different user devices, wherein the consolidated bug report for the first application developer characterizes the problem reports for the particular application reported by the multiple different user devices.

7. The computer-implemented method of claim 1, wherein the portion of the received problem reports associated with the first application developer includes problem reports for multiple different applications developed by the first application developer and distributed through the on-line application store, wherein the consolidated bug report for the first application developer characterizes the problem reports for the multiple different applications developed by the first application developer and distributed through the on-line application store.

8. The computer-implemented method of claim 1, further comprising providing the first application developer with access to a graphical report generator, wherein the consolidated bug report is provided to the first application developer in a layout specified by a report template generated with the graphical report generator.

9. The computer-implemented method of claim 1, wherein generating, by the computing system, the consolidated bug report for the first application developer comprises choosing to exclude from the consolidated bug report information that specifically identifies the user devices from which the problem reports characterized by the consolidated bug report originated.

10. The computer-implemented method of claim 1, wherein generating, by the computing system, the consolidated bug report for the first application developer comprises selecting one of a plurality of different levels of information associated with the problem reports being characterized in the consolidated bug report to include in the consolidated bug report, the selection based on a level of trust associated with the first application developer.

11. The computer-implemented method of claim 1, further comprising:

analyzing, by the computing system, the problem reports received from the particular ones of the plurality of user devices;

identifying, by the computing system and based on the analysis of the problem reports, related application bugs encountered by different applications' attempts to interact with a common operating system used by multiple ones of the plurality of user devices; and determining, by the computing system and based on the identified related application bugs, a problem with the common operating system used by each of the multiple ones of the plurality of user devices.

12. The computer-implemented method of claim 1, wherein the consolidated bug report for the first application developer is arranged to show, for each of one or more applications distributed through the on-line application store for the first application developer, a frequency of occurrence of problems associated with the application.

13. The computer-implemented method of claim 1, wherein the consolidated bug report for the first application developer is arranged to show, for each of one or more applications distributed through the on-line application store for the first application developer, a list of application bugs for the application sorted by type.

14. The computer-implemented method of claim 1, wherein the consolidated bug report for the first application developer is arranged to show representations of stack traces on user devices that indicate the respective statuses of the user devices when application bugs were detected on the user devices.

15. One or more non-transitory computer-readable media having instructions stored thereon that, when executed by one or more processors, cause performance of operations comprising:

obtaining, at a computing system, information that identifies a plurality of applications that are to be distributed to user devices through an on-line application store operating on the computing system, the plurality of applications provided to the computing system by a plurality of application developers;

receiving, at the computing system, requests from a plurality of user devices to download particular ones of the plurality of applications through the on-line application store;

in response to receiving the requests from the plurality of user devices to download the particular ones of the plurality of applications through the on-line application store, providing the particular ones of the plurality of applications to corresponding ones of the plurality of user devices that requested the particular ones of the plurality of applications;

receiving, at the computing system, problem reports from particular ones of the plurality of user devices, the problem reports indicating application bugs detected while running applications distributed through the on-line application store on the particular ones of the plurality of user devices;

associating, by the computing system, a portion of the received problem reports with a first application developer among the plurality of application developers based on the portion of the received problem reports indicating application bugs that were detected while running applications provided to the computing system by the first application developer;

generating, by the computing system, a consolidated bug report for the first application developer that characterizes the portion of the received problem reports associated with the first application developer; and providing the consolidated bug report to the first application developer.

16. The one or more non-transitory computer-readable media of claim 15, wherein:

the plurality of applications are finished releases of the plurality of applications, and the on-line application store is arranged to make accessible the finished releases of the plurality of applications for download and purchase by members of the public, including by users that are not affiliated with the plurality of application developers.

17. The one or more non-transitory computer-readable media of claim 16, wherein the operations further comprise:

receiving, at the computing system and in conjunction with receiving a first of the requests from a first of the plurality of user devices to download a first of the particular ones of the plurality of applications through the on-line application store, authorization to charge a fee for the first application to an account associated with the first of the plurality of user devices that requested to download the first application; and in response to receiving the authorization to charge the fee for the first application, causing, by the computing system, the fee for the first application to be charged to the account associated with the first of the plurality of user devices.

18. The one or more non-transitory computer-readable media of claim 15, wherein the on-line application store is operated by an organization that is separate and independent from the plurality of application developers, wherein the requests received from the plurality of user devices to download particular ones of the plurality of applications through the on-line application store are requests initiated by users that are separate and independent from (i) the organization that operates the on-line application store, and (ii) the plurality of application developers.

19. The one or more non-transitory computer-readable media of claim 15, wherein the operations further comprise:

associating, by the computing system, a second portion of the received problem reports with a second application developer among the plurality of application developers, other than the first application developer, based on the second portion of the received problem reports indicating application bugs that were detected while running applications provided to the computing system by the second application developer;

generating, by the computing system, a second consolidated bug report for the second application developer that characterizes the second portion of the received problem reports associated with the second application developer; and providing the second consolidated bug report to the second application developer.

20. A computing system, comprising:

one or more computer processors; and one or more computer-readable devices storing instructions that, when executed by the one or more computer processors, cause performance of operations comprising:

obtaining, at the computing system, information that identifies a plurality of applications that are to be distributed to user devices through an on-line application store operating on the computing system, the plurality of applications provided to the computing system by a plurality of application developers;

receiving, at the computing system, requests from a plurality of user devices to download particular ones of the plurality of applications through the on-line application store;

in response to receiving the requests from the plurality of user devices to download the particular ones of the plurality of applications through the on-line application store, providing the particular ones of the plurality of applications to corresponding ones of the plurality of user devices that requested the particular ones of the plurality of applications;

receiving, at the computing system, problem reports from particular ones of the plurality of user devices, the problem reports indicating application bugs detected while running applications distributed through the on-line application store on the particular ones of the plurality of user devices;

associating, by the computing system, a portion of the received problem reports with a first application developer among the plurality of application developers based on the portion of the received problem reports indicating application bugs that were detected while running applications provided to the computing system by the first application developer;

generating, by the computing system, a consolidated bug report for the first application developer that characterizes the portion of the received problem reports associated with the first application developer; and providing the consolidated bug report to the first application developer.

* * * * *